United States Patent
Servin

(10) Patent No.: US 11,761,329 B2
(45) Date of Patent: Sep. 19, 2023

(54) TIME-TEMPERATURE NANOSENSORS FOR SUBSURFACE APPLICATIONS

(71) Applicant: SAUDI ARABIAN OIL COMPANY, Dhahran (SA)

(72) Inventor: Jesus Manuel Felix Servin, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/456,922

(22) Filed: Nov. 30, 2021

(65) Prior Publication Data
US 2023/0167735 A1 Jun. 1, 2023

(51) Int. Cl.
*E21B 47/07* (2012.01)
*G01K 5/48* (2006.01)

(52) U.S. Cl.
CPC .............. *E21B 47/07* (2020.05); *G01K 5/486* (2013.01)

(58) Field of Classification Search
CPC ................................ E21B 47/07; G01K 5/486
See application file for complete search history.

(56) References Cited

U.S. PATENT DOCUMENTS

| | | | |
|---|---|---|---|
| 9,447,682 B2 | 9/2016 | Kanj et al. | |
| 9,494,023 B2 | 11/2016 | Turkenburg et al. | |
| 2008/0296023 A1* | 12/2008 | Willauer | E21B 43/08 |
| | | | 977/735 |
| 2012/0142111 A1* | 6/2012 | Tour | E21B 47/11 |
| | | | 977/773 |
| 2013/0091941 A1* | 4/2013 | Huh | E21B 47/11 |
| | | | 73/152.08 |
| 2017/0174978 A1* | 6/2017 | Giro | E21B 43/16 |

(Continued)

FOREIGN PATENT DOCUMENTS

| | | |
|---|---|---|
| CN | 112484876 A | 3/2021 |
| CN | 108441216 B | 4/2021 |
| FR | 3039158 A1 | 1/2017 |

OTHER PUBLICATIONS

Alaskar et al., "Smart Nanosensors for In-Situ temperature Measurement in Fractured Geothermal Reservoirs", Australian Geothermal Energy Conference (Year: 2011).*

(Continued)

*Primary Examiner* — Christopher J Sebesta
(74) *Attorney, Agent, or Firm* — Osha Bergman Watanabe & Burton LLP

(57) ABSTRACT

A downhole composition includes a carrier fluid and at least one shape-changing nanoparticle. The shape-changing nanoparticle is configured to change shape upon exposure to elevated temperature for a period of time. A method of monitoring temperature in a reservoir is provided. The method includes introducing a temperature monitoring composition into the reservoir, the temperature monitoring composition including a carrier fluid and at least one shape-changing nanoparticle. Then, after a predetermined period, producing a produced fluid from the reservoir, collecting samples of the produced fluid, measuring an optical property of the shape-changing nanoparticle, and based on the measured property of the shape-changing nanoparticle, determining a temperature of at least a portion of the reservoir.

14 Claims, 3 Drawing Sheets

(56) References Cited

U.S. PATENT DOCUMENTS

2018/0037803 A1* 2/2018 Dahi Taleghani .... E21B 43/267
2020/0392395 A1* 12/2020 Chen ........................ C09K 8/68

OTHER PUBLICATIONS

Alaskar, M. et al.; "Smart Nanosensors for In-Situ Temperature Measurement in Fractured Geothermal Reservoirs" Australian Geothermal Energy Conference, 2011, (13 pages).

Pedersen, Tom. "Properly designed temperature history nanoparticles may improve residual oil saturation estimates from SWCT tests." Journal of Petroleum Science and Engineering 170, 2018, pp. 383-391 (9 pages).

Zeng, J. et al.; "Nanocrystal-Based Time-Temperature Indicators." Chemistry—A European Journal 16.42, 2010, pp. 12559-12563 (5 pages).

Jordan, M. M., et al.; "Impact of Reservoir Temperature on Scale Inhibitor Retention—The Challenge of Ultra-Low Temperature Sandstone Reservoirs." SPE International, Society of Petroleum Engineers, SPE-179889-MS, 2016, pp. 1-13 (13 pages).

Agenet, N., et al. "Fluorescent Nanobeads: A First Step Toward Intelligent Water Tracers." SPE International, Society of Petroleum Engineers, SPE 157019, 2012, pp. 1-13 (13 pages).

* cited by examiner

TIME-TEMPERATURE NANOSENSORS FOR SUBSURFACE APPLICATIONS

BACKGROUND

Measurement of downhole properties along a subterranean well is critical to the drilling, completion, operation, and abandonment of wells. Wells may be used for recovering hydrocarbons from subsurface reservoirs, injecting fluids into subsurface reservoirs, and monitoring the conditions of subsurface reservoirs. An accurate measurement of the temperature of the subsurface environment is key for numerous oil and gas operations.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a downhole composition that includes a carrier fluid and at least one shape-changing nanoparticle. The at least one shape-changing nanoparticle is configured to change shape upon exposure to elevated temperature for a period of time.

In another aspect, embodiments disclosed herein relate to a method of monitoring temperature in a reservoir. The method includes introducing a temperature monitoring composition into the reservoir, the temperature monitoring composition comprising a carrier fluid and at least one shape-changing nanoparticle. Then, after a predetermined period, producing a produced fluid from the reservoir, collecting samples of the produced fluid, measuring an optical property of the shape-changing nanoparticle, based on the measured property of the shape-changing nanoparticle, determining a temperature of at least a portion of the reservoir.

Other aspects and advantages of the claimed subject matter will be apparent from the following description and the appended claims.

DETAILED DESCRIPTION

In one aspect, embodiments disclosed herein relate to a composition and method for determining the temperature of a reservoir. The disclosed composition and method may provide improvements in the accuracy and precision of temperature monitoring in a reservoir as compared to conventional methods. Typically, temperature monitoring includes the use of temperature sensors in fixed locations downhole. While such temperature sensors may provide accurate measurements at the positions in which they are located, they lack the ability to provide information about the environment around the wellbore and greater distances away from the wellbore. As such, conventional temperature probes are not capable of providing a complete picture of the subsurface temperature of a well environment.

The present disclosure relates to a composition and method for monitoring subsurface temperatures in oil and gas applications. Compositions disclosed herein include a shape-changing nanoparticle that is introduced into a reservoir. The shape-changing nanoparticle diffuses into the fluid in the reservoir and can travel to areas around the wellbore that conventional temperature sensors are not able to access. Upon exposure to elevated temperature, the shape-changing nanoparticles change shape. Their change in shape can be measured using simple analytical techniques and can be correlated to a given time and temperature. Thus, the shape-changing nanoparticles can be applied to monitor temperatures downhole at different locations.

Shape-Changing Nanoparticle Composition

One or more embodiments of the present disclosure relate to a downhole composition comprising a carrier fluid and at least one shape-changing nanoparticle. The shape changing nanoparticle in accordance with one or more embodiments is configured to change shape upon exposure to elevated temperature for a period of time. As used herein, a "nanoparticle" is a particle having a diameter of less than one micrometer in at least one dimension. As used herein "shape-changing nanoparticle" refers a nanoparticle having a particular shape at ambient temperature and a different shape after being exposed to elevated temperature. As used herein, "elevated temperature" with regard to the shape-changing nanoparticle may be any temperature above ambient temperature, and in particular a temperature above 30° C. Specific elevated temperatures are described below.

Figure 1:
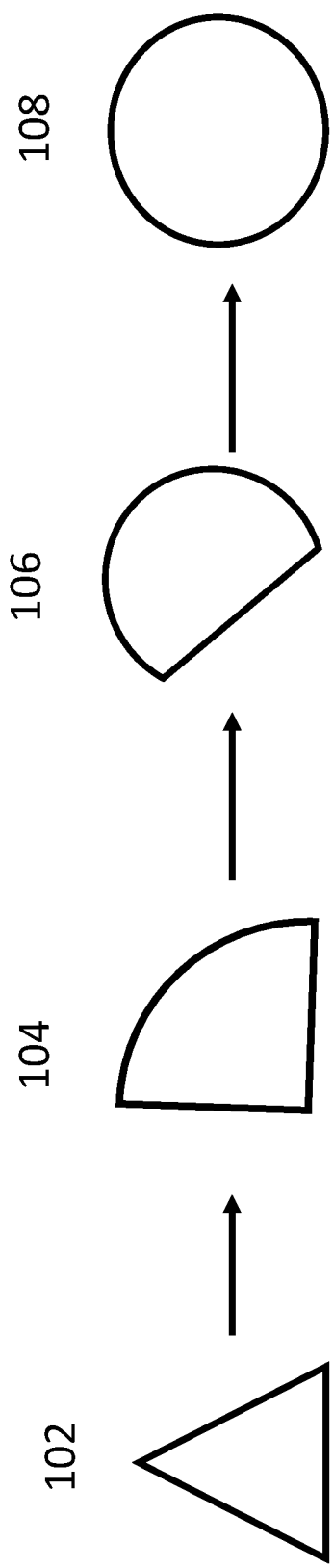
FIG. 1 is a schematic representation of the evolution of a shape-changing nanoparticle upon exposure to elevated temperature in accordance with one or more embodiments.

A shape-changing nanoparticle in accordance with the present disclosure is a nanoparticle whose shape changes upon exposure to elevated temperature. A simplified schematic depiction of a nanoparticle undergoing such a change is shown in FIG. 1. Initially at ambient temperature, the shape-changing nanoparticle has defined facets, meaning flat surfaces and corners. In the embodiment shown in FIG. 1, the initial shape at ambient temperature is a triangle 102. The initial shape of the shape-changing nanoparticle is thermodynamically unstable. As such, when it is exposed to elevated temperature, the shape changes in order to lower the surface energy to a more stable configuration. As the shape-changing nanoparticle is exposed to elevated temperature, the flat surfaces and corners begin to round and lose their sharp edges, as depicted by shape 104. The rounding of the facets continues 106 as the temperature is elevated until the shape has changed into a circle 108. In the simplified illustration show in FIG. 1, all shapes are 2-dimensional, however, as will be understood by a person of ordinary skill in the art, the nanoparticles may be 2 or 3 dimensional in practical use.

The initial shape (meaning the shape at ambient temperature) of the shape-changing nanoparticle may be any suitable shape, provided it has recognizable facets. In one or more embodiments, the initial shape of the shape-changing nanoparticle may be a cuboctahedron, a cube, an octahedron, a tetrahedron, a right bipyramid, a decahedron, an icosahedron, a plate, a bar, a rod, or a wire. Different shapes of nanoparticles may be used in combination. The shape-changing nanoparticle may be made of any suitable material and is typically a metal nanoparticle. Examples of suitable metals for the shape-changing nanoparticle include, but are not limited to, a silver nanoparticle, a gold nanoparticle, a platinum nanoparticle and a palladium nanoparticle.

The shape-changing nanoparticle may have a suitable size for traversing pores of a hydrocarbon-bearing formation without clogging the pores. In one or more embodiments, the shape-changing nanoparticle may have a diameter in a range of from 1 nm to 100 nm (nanometers). The diameter of the shape-changing nanoparticle may have an upper limit of one of 100 nm, 90 nm, 80 nm, 70 nm, 60 nm and 50 nm, and a lower limit of one of 40 nm, 35 nm, 30 nm, 25 nm, 20 nm, 15 nm, 10 nm, 5 nm and 1 nm, where any lower limit may be paired with any mathematically compatible upper limit.

Shape-changing nanoparticles in accordance with the present disclosure have optical properties that make them suitable for mapping temperature in a reservoir. In particular, the shape-changing nanoparticles exhibit localized surface plasmon resonance (LSPR), which results in a specific absorption peak when analyzed using UV-visible spectroscopy. This absorption peak changes as the shape of the nanoparticle changes, shifting the absorption peak to a different wavelength. Thus, the change in shape of the shape-changing nanoparticle may be measured using simple spectroscopic techniques such as UV-Vis.

In one or more embodiments, shape-changing nanoparticles may change shape in a temperature range that is suitable for temperature mapping in a reservoir. In particular, shape-changing nanoparticles may change shape in a temperature range of from 60° C. to 100° C. Additionally, shape-changing nanoparticles in accordance with one or more embodiments change shape on a time scale that is suitable for temperature mapping in a reservoir. In particular, shape-changing nanoparticles may change shape over the course of one day to ten days.

As noted previously, the downhole composition in accordance with one or more embodiments includes a carrier fluid. The carrier fluid may be an aqueous fluid. The aqueous fluid is provided to disperse the shape-changing nanoparticles for injection into the well. The aqueous fluid includes water. The water may be distilled water, deionized water, tap water, fresh water from surface or subsurface sources, production water, formation water, natural and synthetic brines, brackish water, natural and synthetic sea water, black water, brown water, gray water, blue water, potable water, non-potable water, other waters, and combinations thereof, that are suitable for use in a wellbore environment. In one or more embodiments, the water used may naturally contain contaminants, such as salts, ions, minerals, organics, and combinations thereof, as long as the contaminants do not interfere with the chemical tracer operations.

In one or more embodiments, viscosifiers and/or polymers may be added to the aqueous fluid to enhance the dispersion stability of the tracers in the fluid. Suitable examples of viscosifiers and/or polymers include, but are not limited to, xanthan gum, guar gum, bentonite and polymers used in enhanced oil recovery operations such as AN-132, AN-125, and combinations thereof. The carrier fluid may also include surfactants to improve the stability of the nanoparticles. For example, the carrier fluid of one or more embodiments may include anionic surfactants, cationic surfactants, zwitterionic surfactants, and combinations thereof.

The disclosed downhole composition includes a suitable concentration of the shape-changing nanoparticles. The concentration of the shape-changing nanoparticles depends on multiple parameters such as volume of interest, nanoparticles type, subsurface temperature, salinity, and pH, among others. In one or more embodiments, the downhole composition may include from about 0.1 to 10.0 wt. % (weight percent) of the shape-changing nanoparticles based on the total weight of the composition. The concentration of the shape-changing nanoparticles may have a lower limit of one of 0.1, 0.2, 0.5, 0.7, 1.0, 1.2, 1.5, 2.0. 2.5, 3.0 and 5.0 wt. %, and an upper limit of one of 7.0, 7.5, 8.0, 8.5, 9.0, 9.5 and 10.0 wt. %, where any lower limit may be paired with any mathematically compatible upper limit.

Method of Making a Shape-Changing Nanoparticle

Shape-changing nanoparticles in accordance with the present disclosure may be made according to known methods, as would be appreciated by those skilled in the art. Various methods may be used to make shape-changing nanoparticles, and an exemplary synthesis of spherical silver nanoparticles is provided below.

[In one or more embodiments, the method includes providing an aqueous solution of a silver complex in the presence of a primary reducing agent. The silver complex may be silver nitrate ($AgNO_3$). Silver nitrate may be present at a concentration ranging from about 0.05 mM to about 1 mM. For example, silver nitrate may be present at a concentration having a lower limit of one of 0.05, 0.07, 0.1, 0.2, 0.3 and 0.4 mM and an upper limit of one of 0.5, 0.6, 0.7, 0.8, 0.9, and 1.0 mM, where any lower limit may be paired with any mathematically compatible upper limit.

The aqueous solution includes water. The water may be deionized water. The water may be present in an amount of about 50 mL to about 500 mL. For example, the aqueous solution may include water in an amount having a lower limit of one of 50, 75, 90, 100, 150, and 200 mL and an upper limit of one of 250, 300, 350, 400, 450 and 500 mL, where any lower limit may be paired with any mathematically compatible upper limit.

As described above, the method includes providing an aqueous solution of a silver complex in the presence of a primary reducing agent. In one or more embodiments, the primary reducing agent is trisodium citrate. The primary reducing agent may be present at a concentration ranging from about 0.1 to 1 mM. For example, the aqueous solution may include a stabilizing agent at a concentration having a lower limit of one of 0.1, 0.15, 0.2, 0.25, 0.3, 0.35, 0.4, 0.45, and 0.5 mM and an upper limit of one of 0.55, 0.6, 0.65, 0.7, 0.75, 0.8, 0.85, 0.9, 0.95, and 1.0 mM, where any lower limit may be paired with any mathematically compatible upper limit.

After providing an aqueous solution of a silver complex in the presence of a primary reducing agent, embodiment methods include injecting a secondary reducing agent into the solution to provide the spherical silver nanoparticles. The secondary reducing agent may be injected dropwise to the solution to prevent overheating. The secondary reducing agent may sodium borohydride. The secondary reducing agent may be added so that in solution it is present at a concentration ranging from 0.05 to 1 mM. For example, the secondary reducing agent may be present at a concentration having a lower limit of one of 0.05, 0.07, 0.1, 0.2, 0.3 and 0.4 mM and an upper limit of one of 0.5, 0.6, 0.7, 0.8, 0.9, and 1.0 mM, where any lower limit may be paired with any mathematically compatible upper limit.

Subsequently, a particle stabilizing agent may be added dropwise to the aqueous solution containing the silver nanoparticles. As will be appreciated by those skilled in the art, nanoparticles have a high surface energy and may agglomerate if the surfaces are not stabilized. Thus, appropriate stabilizing agents may be used to reduce the surface energy of the nanoparticles. For example, the particle stabilizing agent may be a solution of bis(p-sulfonatophenyl) phenylphosphine dihydrate dipotassium salt. The solution may have a concentration of 5 mM.

Method of Using a Downhole Composition to Measure Temperature

Figure 2:
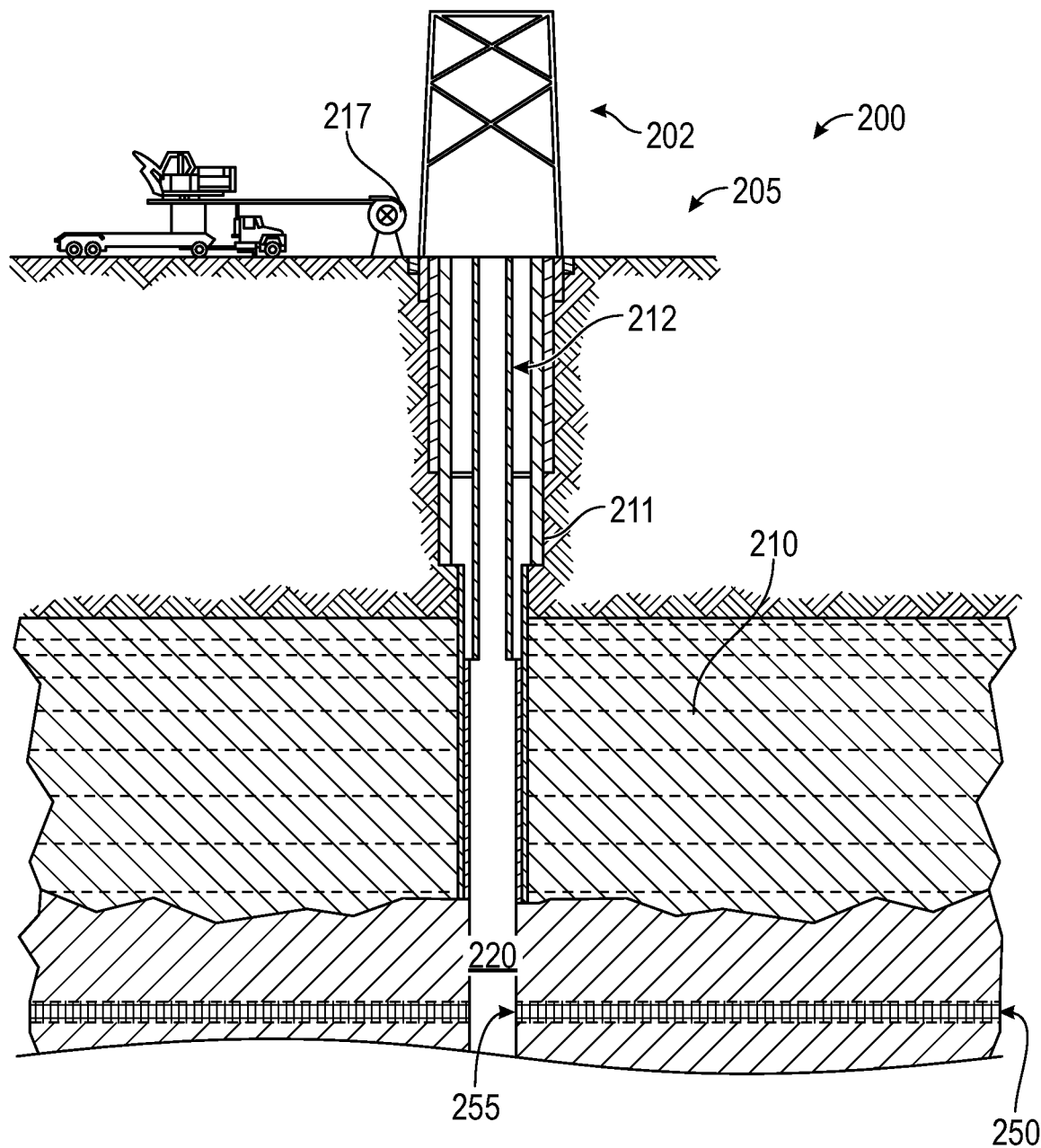
FIG. 2 is a schematic representation of a well environment in accordance with one or more embodiments.

One or more embodiments of the present disclosure relate to a method of using the downhole composition to monitor the temperature of a reservoir. FIG. 2 is a diagram that illustrates a well environment 200 in accordance with one or more embodiments. Well environment 200 includes a subsurface 210. Subsurface 210 is depicted having a wellbore wall 211 both extending downhole from a surface 205 into the subsurface 210 and defining a wellbore 220. The well environment includes a well head 202 at the surface 205. The subsurface also includes target formation 250 in which temperature in the formation is determined. Target formation 250 has target formation face 255 that fluidly couples target formation 250 with wellbore 220 through wellbore wall 211. In this case, casing 212 extends downhole through the wellbore 220 into the subsurface 210 and towards target formation 250.

With the configuration in FIG. 2, the previously described downhole composition may be introduced into the subsurface 210 and towards target formation 250 via a pump 217 through valves located in the well head. Hydrocarbon-bearing formations may include any oleaginous fluid, such as crude oil, dry gas, wet gas, gas condensates, light hydrocarbon liquids, tars, and asphalts, and other hydrocarbon materials. Hydrocarbon-bearing formations may also include aqueous fluid, such as water and brines. Hydrocarbon-bearing formations may include formations with pores sizes of from about 100 nm to 100 µm. As such, shape-changing nanoparticles have sizes in an appropriate range to traverse pores of hydrocarbon-bearing formations, as previously described. Embodiment downhole compositions may be appropriate for use in different types of subterranean formations, such as carbonate, shale, sandstone and tar sands.

In order to accurately determine downhole temperature, in one or more embodiments, the optical properties of the shape-changing nanoparticles are measured prior to injection downhole to provide a calibration curve. A calibration curve may be made by preparing multiple solutions with the same concentration of nanoparticles. Each solution may then be exposed to a different temperature and the UV absorption is measured over time. For example, three solutions with the same concentration of nanoparticles are prepared; solution 1 is exposed to 60° C., solution 2 to is exposed to 70° C., and solution 3 is exposed to 80° C. Once the solutions reach the desired temperature, the UV absorption is measured over time to determine how it changes as a function of time. The resulting calibration curve may be compared to UV absorption spectra collected from shape-changing nanoparticles in the field after downhole exposure to determine the temperature of the formation.

Figure 3:
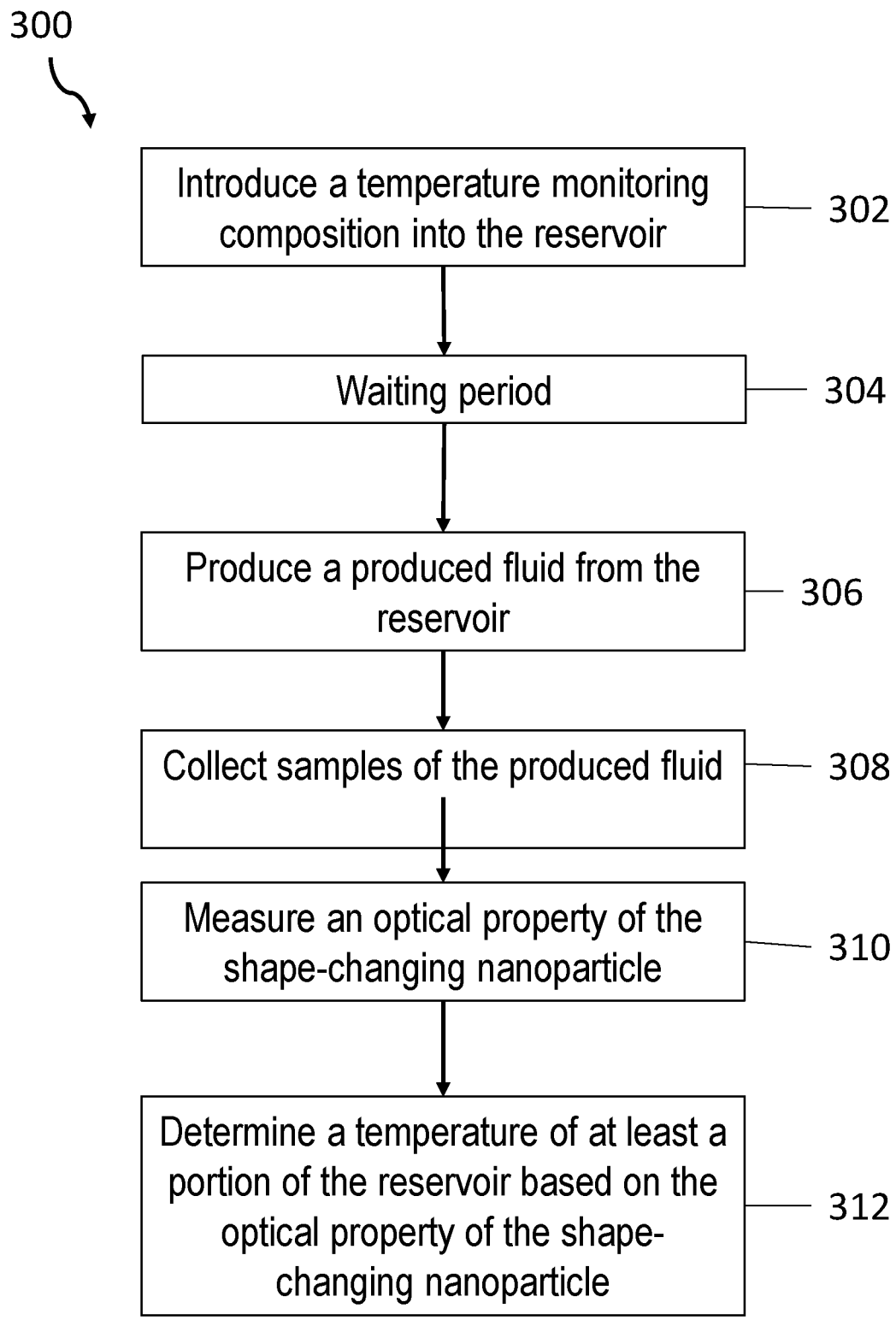
FIG. 3 is a block flow diagram of a method in accordance with one or more embodiments.

A method of determining residual oil in a reservoir in accordance with one or more embodiments of the present disclosure is shown in FIG. 3. The method 300 includes introducing a temperature monitoring composition into a reservoir 302. The temperature monitoring composition is the downhole composition including a shape changing nanoparticle and a carrier fluid as previously described.

The amount of temperature monitoring composition injected may vary based on the specific formation. Specifically, the radius and height of the formation as well as the porosity of the formation may be considered when determined the amount of composition to inject into the wellbore. An amount sufficient to fill the volume of interest in the reservoir may be injected based on such parameters of the formation of interest.

Once the composition has been introduced into the wellbore, the composition remains downhole without producing fluid for a predetermined period of time 304. This period of time may be from about one day to about ten days. During this period of time, the shape-changing nanoparticles will change shape if the temperature downhole is sufficiently high to induce a shape change. In one or more embodiments, the temperature downhole may be an elevated temperature from about 60° C. to 100° C. The period of time that the composition remains downhole depends on the volume of interest in the reservoir. Generally, the larger the volume of interest, the longer the composition will remain downhole. In one or more embodiments, the temperature-monitoring composition may be particularly well-suited for near-wellbore applications, meaning temperature monitoring at a distance of tens of meters from the wellbore.

After the previously described period of time has passed, fluid is produced from the reservoir 306. The amount of fluid that is produced depends on the amount of composition that was injected into the reservoir 306. However, at least the same amount of fluid is produced as the amount of composition that was injected. In some embodiments, up to twice the amount of fluid is produced, compared to the amount of injected downhole composition. The produced fluid includes shape-changing nanoparticles as previously described. The shape-changing nanoparticles in the produced fluid have been exposed to reservoir conditions for the predetermined period of time.

As fluid is produced from the reservoir, samples are collected from the produced fluid 308 for analysis. The fluids that are produced from the reservoir first are representative of the region closest to the wellbore. Accordingly, fluids that are produced later represent regions further away from the wellbore. A suitable number of samples may be collected to determine temperature for the entire volume of interest.

After collecting samples 308, an optical property of the shape-changing nanoparticles is measured 310. The optical property may be the absorption spectrum in UV-visible spectroscopy, for example. Samples 308 may be purified prior to obtaining UV spectra, as contaminants may interfere with the measurements. Such purification could include removal of organic matter and/or other chemical components collected in the produced fluid. As noted previously, the absorption peak in UV-vis shifts as a function of the shape-changing nanoparticles, thus, the shift in the absorption peak due to exposure to elevated temperature may be measured.

Based on the optical property of the shape-changing nanoparticle that is measured, the temperature of at least a portion of the reservoir may be determined 312. As described above, once the fluid is produced, samples will be taken over time. The time and flow rate can be used to estimate the region from which the samples were collected. Then, the UV absorption of the samples may be compared to a calibration curve to determine the temperature of that region. Higher temperature regions will result in faster change in shape and optical properties of the nanoparticles, therefore differentiating regions of the formation based on temperature. Additionally, nanoparticles can be engineered to undergo a shape change only above a certain threshold, for example, above 80° C. As such, a nanoparticle engineered to change shape above 80° C., for example, may be injected into the wellbore first, since higher temperatures are expected farther away from the wellbore, whereas nanoparticles engineered to change shape at lower temperatures may be injected later.

The methods described herein are not limited to using a single type of shape-changing nanoparticle. Indeed, the previously described compositions and methods may readily be applied to systems with two or more different shape-changing nanoparticles. In such embodiments, a first shape-changing nanoparticle may be introduced into the reservoir. The first shape-changing nanoparticle typically changes shapes at higher temperature and is less sensitive to temperature changes than other shape-changing nanoparticles being employed. Then, a second shape-changing nanoparticle that changes shape at a lower temperature than the first shape-changing nanoparticle and is more sensitive to temperature changes may be introduced into the reservoir. The resolution of the temperature profile may be further enhanced by adding additional shape-changing nanoparticles, injecting the least sensitive particles first, and the most sensitive last.

The compositions and methods described herein may be useful for a variety of applications in oil and gas technologies. For example, understanding temperature in a reservoir may be advantageous for single well chemical tracer tests (SWCTT). It is well known in the art that the production of the secondary tracer in a SWCTT depends on the temperature. However, typical tests assume isothermal conditions despite the fact that the injection of the tracer itself may be causing a temperature gradient in the area around the wellbore. Therefore, the production of the secondary tracer will be faster at distances further from the wellbore (i.e., higher temperatures), and lower near the injection site (i.e., lower temperatures). Ignoring this temperature gradient can lead to underestimation of the residual oil saturation. In this context, the compositions and methods disclosed herein may be used to account for the effect of temperature on secondary tracer production and to correct the residual oil estimation.

Gels have been used by the oil and gas industry in the context of conformance control and water shut-off. Gel formulations are typically optimized to solidify after a certain amount of time under specific subsurface conditions. Among multiple factors, temperature can have a significant influence on the time it takes for a gel to set. Therefore, it is important to have accurate information about the subsurface temperature. Certain logs can be used to determine the near-wellbore temperature, but the information can be limited to the area close to the injection site. In this context, having more information about the subsurface temperature distribution can assist in gel formulation development and deployment for specific reservoir environments.

Scale-inhibitor squeeze jobs are used in the oil and gas industry to prevent the formation of inorganic scale. Squeeze jobs involve pumping scale-inhibitors that are retained by reservoir rock. Once a well is put back on production, the inhibitor starts being released into the produced water to prevent scaling. The amount of inhibitor retained by the reservoir rock depends on the temperature. Therefore, subsurface temperature distribution is a key consideration for the design of squeeze jobs.

Pressure transient analyses are used in the oil and gas industry to improve reservoir description and characterization. Many conventional pressure transient analysis methods assume homogenous thermal distribution in the reservoir, even when it is known that the temperature of the fluids change due to changes in the flow conditions in the reservoir. The disclosed compositions and methods may be used to obtained more refined temperature distribution map of the subsurface, and thus provide better pressure transient analysis.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A downhole composition comprising:
   a carrier fluid; and
   at least one shape-changing nanoparticle, wherein the at least one shape-changing nanoparticle is configured to change shape upon exposure to elevated temperature for a period of time, and
   wherein the at least one shape-changing nanoparticle has a diameter of from 1 to 100 nm; and
   wherein a shape of the at least one shape-changing nanoparticle is selected from the group consisting of a cuboctahedron, a cube, an octahedron, a tetrahedron, a right bipyramid, a decahedron, an icosahedron, a plates, a bars, a rod, and a wire.

2. The composition of claim 1, wherein the carrier fluid is an aqueous carrier fluid.

3. The composition of claim 1, wherein the at least one shape-changing nanoparticle is comprised of faceted metal nanoparticles.

4. The composition of claim 1, wherein the at least one shape-changing nanoparticle is selected from the group consisting of a silver nanoparticle, a gold nanoparticle, a platinum nanoparticle and a palladium nanoparticle.

5. The composition of claim 4, wherein the silver nanoparticle is a triangular silver nanoplate at room temperature.

6. The composition of claim 5, wherein the triangular silver nanoplate is configured to change into a round silver nanoparticle upon exposure to the elevated temperature.

7. The composition of claim 1, wherein the composition includes from 0.1 to 1.0 wt. % of the at least one shape-changing nanoparticle based on a total weight of the composition.

8. The composition of claim 1, wherein the elevated temperature is from 80 to 100° C.

9. The composition of claim 1, wherein the period of time is from one day to ten days.

10. A method of monitoring temperature in a reservoir, the method comprising:
   introducing a temperature monitoring composition into the reservoir, the temperature monitoring composition comprising a carrier fluid and at least one shape-changing nanoparticle,
   wherein the at least one shape-changing nanoparticle is configured to change shape upon exposure to elevated temperature for a period of time, and
   wherein the at least one shape-changing nanoparticle is selected from the group consisting of a silver nanoparticle, a gold nanoparticle, a platinum nanoparticle, and a palladium nanoparticle;

after a predetermined period, producing a produced fluid from the reservoir;

collecting samples of the produced fluid;

measuring an optical property of the shape-changing nanoparticle; and based on the measured property of the shape-changing nanoparticle, determining a temperature of at least a portion of the reservoir.

11. The method of claim 10, further comprising, prior to introducing the temperature monitoring composition into the reservoir, creating a calibration curve of the optical property of the shape-changing nanoparticle at at least two temperatures.

12. The method of claim 10, wherein the predetermined period is from one day to ten days.

13. The method of claim 10, where in the measuring the optical property of the shape-changing nanoparticle is conducted using UV-visible spectroscopy.

14. The method of claim 10, wherein the at least one shape-changing nanoparticle comprises a first shape-changing nanoparticle and a second shape-changing nanoparticle, wherein the first shape-changing nanoparticle is configured to change shape at a higher temperature than the second shape-changing nanoparticle.

\* \* \* \* \*